US006196343B1

(12) United States Patent
Strautnieks

(10) Patent No.: US 6,196,343 B1
(45) Date of Patent: Mar. 6, 2001

(54) MID-WHEEL DRIVE WHEELCHAIR

(75) Inventor: Maris Strautnieks, Woodcroft (AU)

(73) Assignee: Rollerchair Pty Ltd., South Australia (AU)

(*) Notice: Subject to any disclaimer, the term of this patent is extended or adjusted under 35 U.S.C. 154(b) by 0 days.

(21) Appl. No.: 09/426,369

(22) Filed: Oct. 25, 1999

(30) Foreign Application Priority Data

Oct. 23, 1998 (AU) .................................................. PP6704

(51) Int. Cl.$^{7}$ .................................................. B62D 61/10
(52) U.S. Cl. .............................................. 180/22; 180/907
(58) Field of Search ....................................... 180/22, 907

(56) References Cited

U.S. PATENT DOCUMENTS

| | | | | |
|---|---|---|---|---|
| 3,917,312 | | 11/1975 | Rodaway | 280/250.1 |
| 4,861,056 | | 8/1989 | Duffy, Jr. et al. | 280/250.1 |
| 5,435,404 | * | 7/1995 | Garin, III | 180/907 |
| 5,540,297 | | 7/1996 | Meier | 180/65.5 |
| 5,848,658 | * | 12/1998 | Pulver | 180/907 |
| 5,944,131 | * | 8/1999 | Schaffner et al. | 180/907 |

* cited by examiner

*Primary Examiner*—Kenneth R. Rice
(74) *Attorney, Agent, or Firm*—Klauber & Jackson

(57) ABSTRACT

The invention provides a mid-wheel drive wheelchair assembly (10) which includes a central base frame (11), a seat frame (12) removably attached to the base frame (11), a pair of transversely spaced leading pivot arms (13, 14) pivotally attached to opposite sides of the base frame respectively for pivotal movement about a common transverse pivot axis (17), a pair of ground engaging mid-drive wheels (19, 20) each mounted adjacent the trailing end of a respective side pivot arm (13, 14), a pair of ground engaging front castor wheels (21, 22) rotatably mounted at the leading ends of the pivot arms (13, 14), and a pair of ground engage rear castor wheels (23, 24) rotatably mounted at opposite ends of a rigid transverse port arm (25) which itself is pivotally mounted to the rear of the base frame (11) centrally thereof. Each of the pivot arms (13, 14) is spring mounted with respect to the base frame by means of coil springs (28, 29) arranged so that any pivotal movement of the arms is cushioned by the coil springs.

8 Claims, 4 Drawing Sheets

MID-WHEEL DRIVE WHEELCHAIR

This invention relates generally to wheelchairs, and in particular to an improved mid-wheel drive wheelchair which incorporates a novel suspension structure.

Wheelchairs have in the past been designed with various types of suspensions for the purpose of improving passenger comfort and ride during travel over uneven surfaces. While there has been emphasis on the design of the actual seating arrangement for improving passenger comfort and ride, very little attention has been given to the suspension system for the wheelchair, nor its manoeuvrability in confined areas.

One of the problems for occupants of wheelchairs is the severe shock vibrations that are transmitted from the wheels of the wheelchair through its frame to the seat when the wheelchair travels across uneven terrain thereby causing discomfort to the wheelchair occupant. In some cases, riding the wheelchair over such terrain can be quite dangerous and often results in the wheelchair toppling over.

Several attempts have been made to improve the suspension of wheelchairs, and one example of this is to independently spring each of the rear wheels to the underframe of the wheelchair. Another example employs independent shock absorber suspensions for the rear wheels as well as the pair of front wheels. In this regard, reference is made to U.S. Pat. Nos. 5,540,297, 3,917,312, 4,861,056 and 4,455,031. In each case it will be noted that the wheelchair is restricted to a pair of rear drive wheels and a pair of front castor wheels.

In recent times, wheelchairs have been designed with a mid-wheel drive configuration which employs a pair of rear wheels, a pair of intermediate drive wheels, and a pair of anti-tipping front wheels which are normally held clear of the ground, for the purpose of improving the chair's turning ability and manoeuvrability. Common to mid-wheel drive chairs is a "teeter-totter" motion which occurs when the wheelchair rocks forward over the drive wheels. This motion will normally occur when the vehicle is going down inclines, stopping, or slowing. Any unsafe forward tilting or tipping movement of the chair is avoided by virtue of the front anti-tipper wheels which ensure that the chair does not topple. It is also known for the anti-tipper wheels to be located at the rear of the base frame of the wheelchair (rather than at the front thereof), with the pair of front castor wheels being mounted to, remain in permanent contact with the ground. An example of this is shown in U.S. Pat. No. 5,540,297.

It has now been found that considerable improvement in wheelchair ride and comfort, as well as wheelchair manoeuvrability, can be achieved by employing a wheelchair having a mid-wheel drive configuration in association with a pair of front castor wheels and a pair of rear castor wheels which remain in constant contact with the ground, and wherein the front and mid-drive wheel on each side of the chair frame are independently sprung with respect to the base frame of the wheelchair.

It is the main object of the present invention therefore to provide a mid-wheel drive wheelchair which has a novel underframe which includes three sets of ground engaging wheels and which incorporates a very simple and inexpensive suspension arrangement for improving rider comfort, stability and manoeuvrability of the wheelchair.

It is another object of the present invention to provide a mid-wheel drive wheelchair which has improved driving wheel traction properties.

Broadly according to this invention therefore, a mid-wheel drive wheelchair comprises:

a central base frame, a seat or chair frame attachable to the base frame, a pair of leading pivot arms pivotally supported on opposite sides of said base frame for independent pivotal movement relative to the base frame about a common transverse pivot axis, each said pivot arm extending forwardly of the front end of the base frame, a mid-drive wheel mounted for rotation on each of said pivot arms adjacent its trailing end, with the axle of each drive wheel being located a short distance rearwardly of the pivot axis of the pivot arms, a pair of ground-engaging front castor wheels respectively mounted at the leading ends of said pivot arms, spring means respectively acting between each said side pivot arm and an adjacent side portion of the base frame, said spring means, in use, being arranged to resist pivotal movement of its associated said pivot arm and to allow the base frame to tilt under spring pressure with respect to the pivot arms, and a pair of ground engaging rear castor wheels preferably located on opposite sides of the base frame and spaced rearwardly therefrom, said rear castor wheels being movably supported with respect to the base frame.

Desirably the rear castor wheels are respectively rotatably mounted at opposite ends of a rigid transverse support arm which extends across the width of the wheelchair and is pivotally connected to the rear end of the base frame, centrally thereof, for rotation about a central longitudinal axis.

Preferably each of the mid-drive wheels is coupled to an electric drive motor so that the wheelchair can be power driven.

Preferably each said spring means comprises a pair of coil compression springs respectively located fore and aft of the pivot axis of their associated pivot arm.

In a preferred embodiment of the invention, the chair or seat frame is releasably attached to said base frame by releasable spring-loaded locking means.

Preferably the distance between the pivot axis and the axis of each of the drive wheel axles is small relative to the length of the pivot arm, so as to provide a mechanical advantage for each of the pivot arms when the front castor wheel is vertically displaced, eg when travelling over uneven terrain. This in turn also minimises vertical displacement of the base frame and thereby improves rider comfort over uneven terrain.

Preferably the chair or seat of the wheelchair is attached to the base frame in a manner so that substantially the whole weight of the wheelchair rider is distributed over the mid-drive wheels, so as to provide better traction for the drive wheels, and avoid undesirable loading of the front castors. With conventional rear wheel drive wheelchairs, the weight distribution tends to be too far back and the chair can become unstable, eg by tipping backwards.

In order to more fully explain the present invention, an embodiment is described hereunder in some further detail with reference to the accompanying drawings wherein:

FIG. 3 is a side elevational view of the underframe assembly shown in FIG. 2 and which shows the wheelchair seat and seat frame fitted thereto; while

Figure 1:
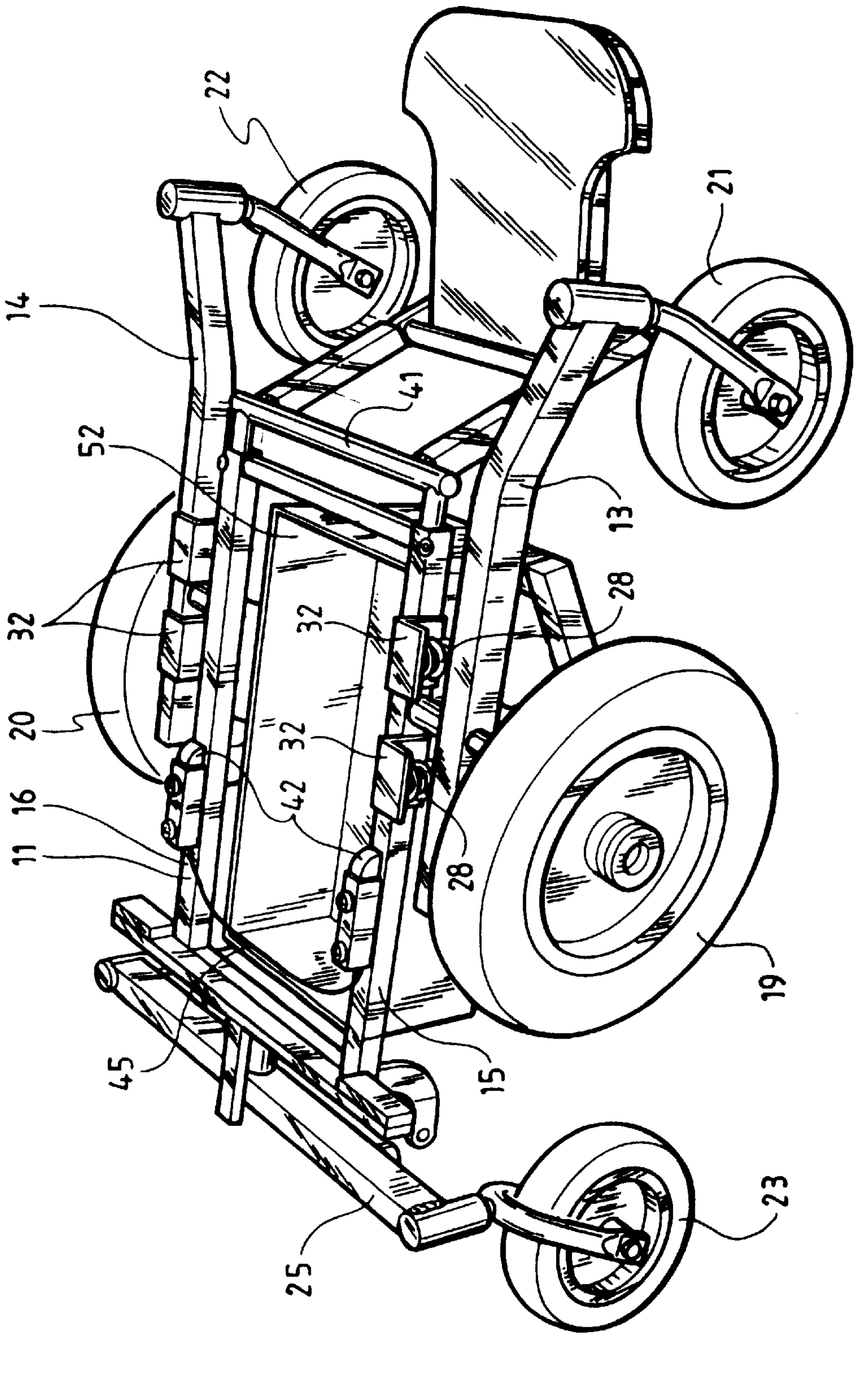
FIG. 1 is a front perspective view of the underframe of a mid-wheel drive wheelchair designed in accordance a preferred embodiment of the present invention.

Referring to the drawings, a mid-wheel drive wheelchair 10 includes an approximately central base frame or underframe 11 of rectangular shape, a seat frame 12 removably attached to the base frame 11, a pair of laterally spaced leading pivot arms 13, 14 each pivotally attached to a respective side frame member 15, 16 of the base frame 11 for pivotal movement about a common transverse pivot axis 17, a pair of ground engaging mid-drive wheels 19, 20 each rotatably mounted adjacent the trailing end of a respective side pivot arm 13, 14, a pair of ground engaging front castor wheels 21, 22 rotatably mounted at the leading ends of the pivot arms 13, 14, and a pair of ground engaging rear castor wheels 23, 24 which are rotatably mounted at the opposite ends of a rigid transverse support arm 25 which itself is pivotally mounted to the rear of the base frame 11 centrally thereof, for pivotal movement about a central longitudinal axis 26.

Figure 2:
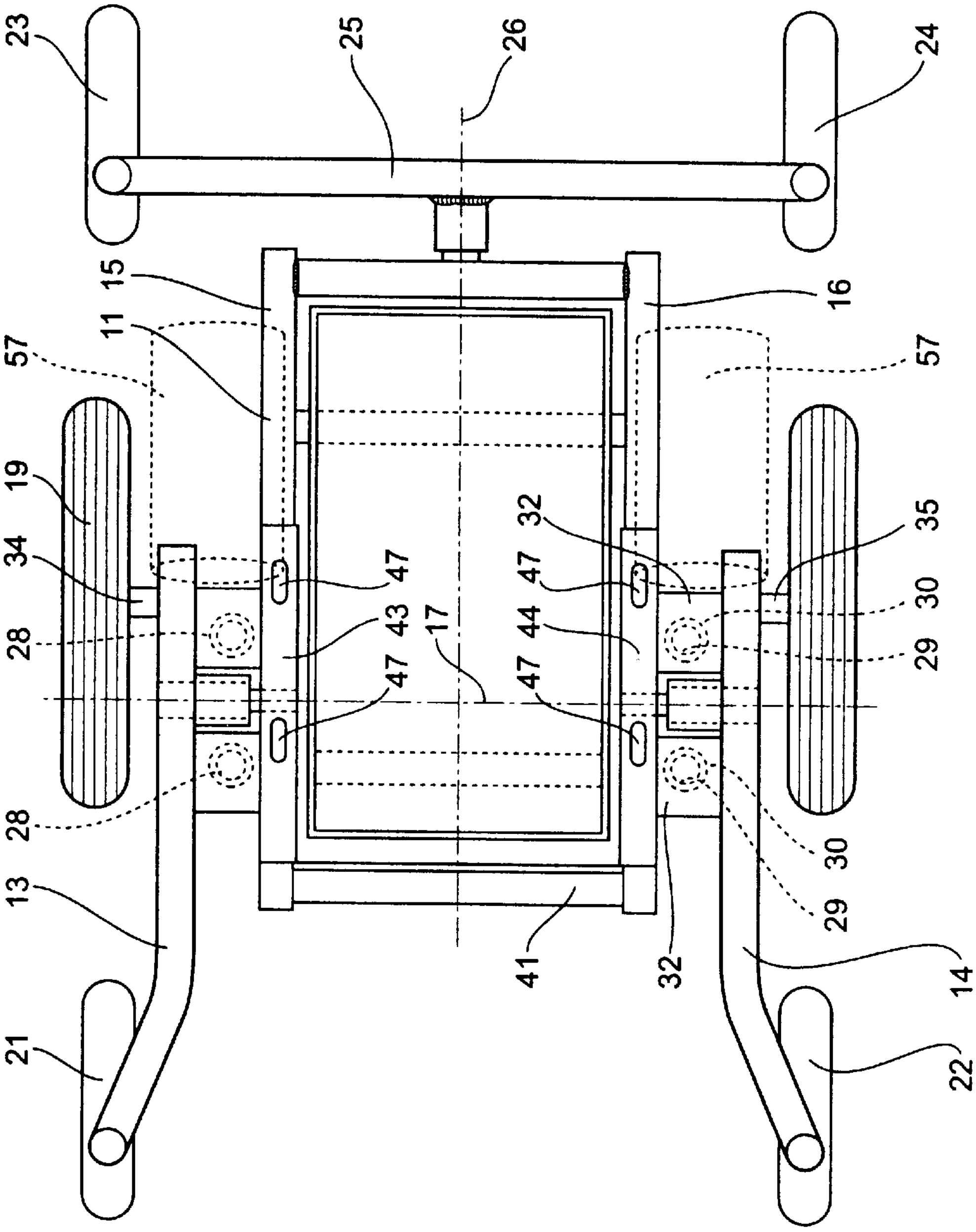
FIG. 2 is a plan view of the underframe assembly shown in FIG. 1 (and which also shows part of the seat frame shown in FIG. 3)

As shown in FIG. 2, each of the side pivot arms 13, 14 is spring-mounted in relation to the base frame 11 by means of pairs of coil springs 28, 29 respectively, there being one spring on each side of the pivot axis 17, whereby any pivotal movement of the arms 13, 14 is cushioned by the coil springs and in turn provides a cushioning effect for the base frame when the wheelchair 10 travels over uneven terrain the arrangement of the leading pivot arms 13, 14 and the coil springs 28, 29 forms an independent suspension for each of the front castor wheels 21, 22 and permits the wheels 21, 22 to travel up and down independently of the other, and furthermore allows forward tilt movement of the base frame 11 about pivot axis 17 relative to the arms 13, 14 by virtue of there being no mechanical connection between the forward ends of the base frame 11 and the arms 13, 14.

Figure 4:
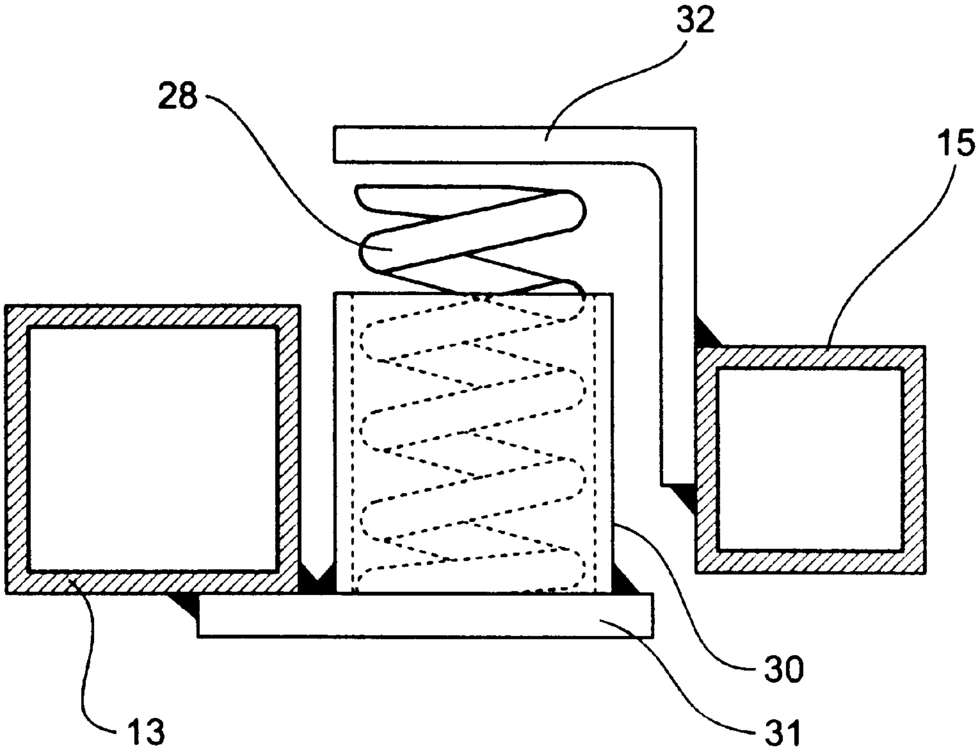
FIG. 4 is a fragmentary partly sectioned, elevational view of the spring mount for each leading pivot arm.

In this embodiment, each one of each pair of coil springs 28, 29 is loosely located in a tubular sleeve 30 welded to a base plate 31 which is fixed to an inner side of the arm 13, 14 and projects inwardly thereof (refer FIG. 4). The upper end of the coil spring abuts against an angle plate 32 welded to a respective side frame member 15, 16 of the base frame 11. In this embodiment the fore and aft coil springs of each pair are approximately equally spaced from the pivot axis 17 (although this is not essential).

As also shown in FIG. 2, each of the mid-dive wheels 19, 20 is rotatably mounted on an axle 34, 35 respectively which itself is journalled for rotation in a bearing carried by the arm 13, 14, with the common axis 36 of the axles 34, 35 being spaced a short distance rearwardly of the pivot axis 17 so as to provide a mechanical advantage for the arms 13, 14 when they undergo pivotal movement.

It is a feature of the present invention that the front castor wheels 21, 22, the mid-drive wheels 19, 20 and the rear castor wheels 23, 24 remain substantially in constant contact with the ground regardless of its unevenness, with the sets of front and rear castor wheels 21, 22 and 23, 24 providing vastly increased stability and balance for the wheelchair and its occupant particularly when the wheelchair is travelling over a steep incline or decline. It will also be appreciated that in the event of either one of the front castor wheels undergoing vertical movement, eg by running over an obstruction, the upward pivotal movement of the pivot arm 13, 14 will result in increased traction for the drive wheel 19, 20, with the base frame 11 undergoing very little displacement. The front and rear castor wheels also greatly increase the sterility and manoeuvrability of the wheelchair 10, particularly in confined spaces.

Figure 3:
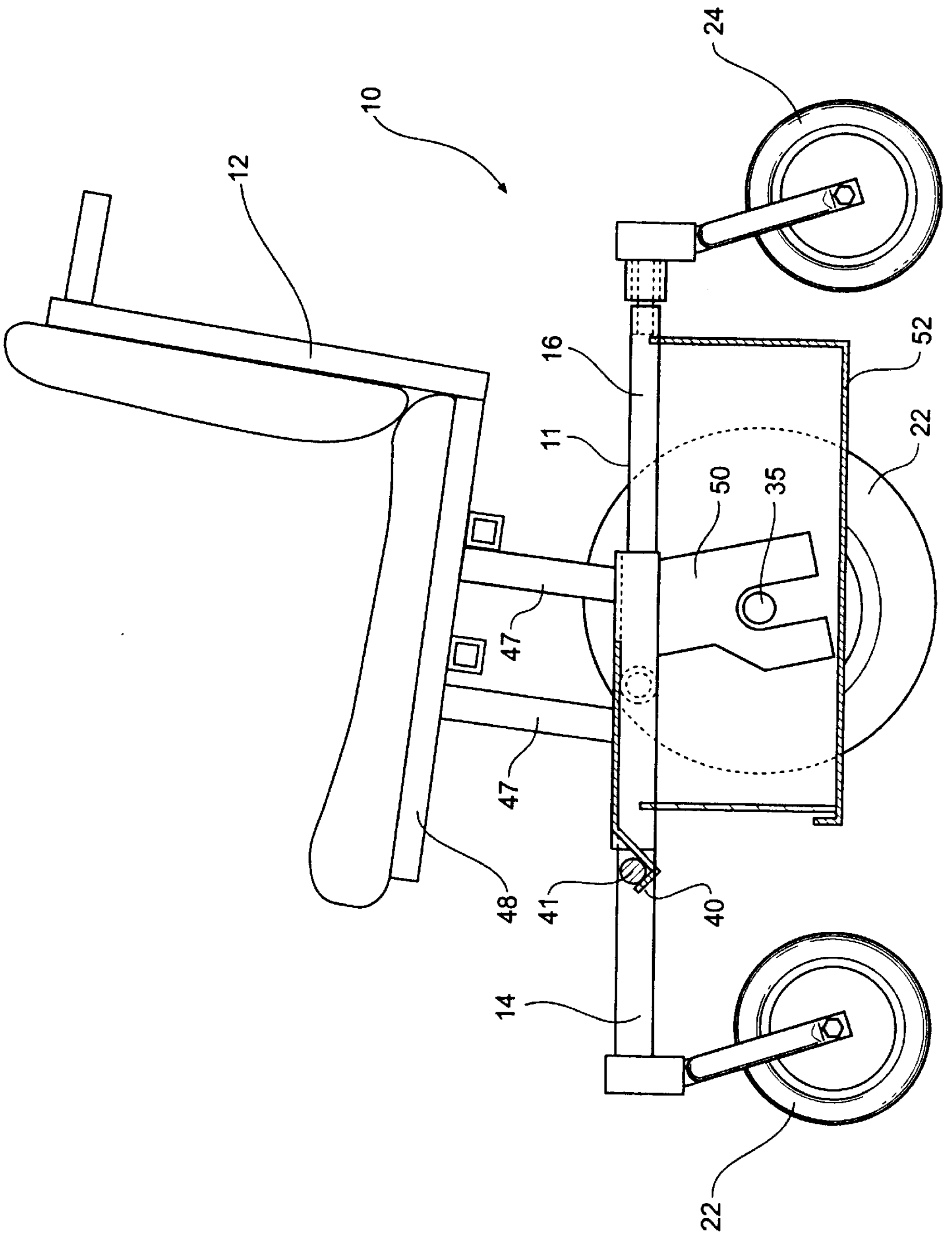

As shown in FIG. 3, the seat frame 12 is releasably secured to the base frame 11 by means of an angle latch bar 40 which interlocks with the front cross-bar 41 of the base frame 11 which extends across the width thereof. The rear bottom end of the seat frame 12 is held in place by means of a pair of spring-loaded latch members 42 which mockingly engage with the rear ends of bottom rails 43, 44 of the seat frame 12, and which locate directly on top of the side frame members 15, 16 of the base frame 11. The latches 42 are retracted by means of a pull-cord 45 to a release position to enable the seat frame 12 to be detached from the base frame 11.

The seat frame 12 is supported above the base frame 11 by means of transversely spaced apart pairs of uprights 47 which extend between the bottom rails 43, 44 and the underside of the seat base 48. As shown in FIG. 3, the seat frame 12 and its seat 48 are located almost directly above the axles 34, 35 of the mid-drive wheels 19, 20. As a result, almost all of the weight of the wheelchair occupant is distributed over the drive wheels 19, 20 which affords better stability and traction.

Desirably, each of the drive wheels 19, 20 is driven by an electric motor 51 mounted by means of a motor mounting plate 50 fixed to and depending from the pivot arm 13, 14 adjacent its trailing end. In accordance with known art, each of the drive motors is coupled to a gearbox which can be engaged and disengaged by a control lever mounted on the seat frame 12. With the gearbox disengaged, the drive wheels can be manually driven or the wheelchair pushed by an assistant from behind. Due to the improved weight distribution afforded by the positioning of the seat frame 12 directly above the drive wheels 19, 20, the wheelchair can be easily pushed with very little manual effort required.

Also in accordance with known art, the base frame 11 is provided with a cradle 52 for locating and storing batteries for powering the electric motors.

A brief consideration of the above-described embodiment will indicate that the invention provides for a very simple and relatively inexpensive construction for an underframe of a mid-wheel drive wheelchair, one which provides vastly improved ride characteristics, stability, manoeuvrability, and steerability for a wheelchair, and which avoids the use of anti-tip stabilising wheels. By having three pairs of wheels remaining in constant contact with the ground, regardless of its unevenness, the stability and balance of the chair is significantly improved, particularly when travelling down or up sharp inclines, or in the event of the wheelchair coming to a sudden stop.

The claims defining the invention are as follows:

1. A mid-wheel drive wheelchair comprising:

a central base frame, a seat or chair frame attachable to said base frame, a pair of leading pivot arms pivotally supported on opposite sides of said base frame for independent pivotal movement relative to the base frame about a common transverse pivot axis, each said pivot arm extending forwardly of the front end of the base frame, a mid-drive wheel mounted for rotation on each of said pivot arms adjacent its trailing end, with the axle of each drive wheel being located a short distance rearwardly of the common transverse pivot axis of said pivot arms, a pair of ground engaging front castor wheels respectively mounted at the leading ends of said pivot arms, spring means respectively acting between each said pivot arm and an adjacent side portion of the base frame, said spring means, in use, being arranged to resist pivotal movement of its associated said pivot arm and to allow the base frame to tilt under spring pressure with respect the pivot arms, and a pair of transversely spaced apart ground engaging rear castor wheels movable supported with respect to said base frame.

2. A mid-wheel drive wheelchair according to claim 1 wherein said rear castor wheels are respectively rotatable mounted at opposite ends of a rigid transverse support arm which extends across the width of the wheelchair and is pivotally connected to the rear end of the base frame, centrally thereof, for rotation about a central longitudinal axis.

3. A mid-wheel drive wheelchair according to either claim 1 or claim 2 wherein each said spring means comprises a pair of coil compression springs respectively located fore and aft of the pivot axis of the associated pivot arm.

4. A mid-wheel drive wheelchair according to claim 1 wherein the distance between said common transverse pivot axis and the axis of each drive wheel axle is small relative to the length of the pivot arm, so as to provide a mechanical advantage for each of the pivot arms when its front castor wheel is vertically displaced.

5. A mid-wheel drive wheelchair according to claim 1 wherein the seat or chair frame is attached to said base frame in a manner so that substantially the whole weight of the wheelchair rider is distributed over the mid-drive wheels, so as to provide improved traction for said drive wheels.

6. A mid-wheel drive wheelchair according to claim 1 wherein the seat or chair frame has a pair of base rails extending longitudinally of said base frame, each said base rail being releasably attached, at its rear end to said base frame by releasable spring loaded locking means.

7. A mid-wheel drive wheelchair according to claim 6 wherein said central base frame includes a transverse cross bar at its forward end, and wherein said seat or chair frame includes a transverse hook defining rail extending between said base rails at or adjacent their forward ends and which is arranged to hookingly engage with said cross bar for securing the forward end of the seat or chair frame to the base frame.

8. A mid-wheel drive wheelchair according to claim 1 wherein each of the mid-drive wheels is coupled to an electric drive motor, each said motor being mounted by means of a motor mounting plate fixed to and depending from its associated said pivot arm adjacent its trailing end thereof.

* * * * *

US006196343C1

(12) EX PARTE REEXAMINATION CERTIFICATE (6918th)

United States Patent

Strautnieks

(10) Number: US 6,196,343 C1

(45) Certificate Issued: Jul. 7, 2009

(54) MID-WHEEL DRIVE WHEELCHAIR

(75) Inventor: Maris Strautnieks, Woodcroft (AU)

(73) Assignee: Invacare Corporation, Elyria, OH (US)

Reexamination Request:
No. 90/007,491, Mar. 31, 2005

Reexamination Certificate for:

| | |
|---|---|
| Patent No.: | **6,196,343** |
| Issued: | **Mar. 6, 2001** |
| Appl. No.: | **09/426,369** |
| Filed: | **Oct. 25, 1999** |

(30) Foreign Application Priority Data

Oct. 23, 1998 (AU) ............................................ PP6704

(51) Int. Cl.

| | |
|---|---|
| ***A61G 5/00*** | (2006.01) |
| ***A61G 5/04*** | (2006.01) |
| ***A61G 5/06*** | (2006.01) |
| ***A61G 5/10*** | (2006.01) |
| ***B62D 61/10*** | (2006.01) |

(52) U.S. Cl. ......................................... 180/22; 180/907

(58) Field of Classification Search ........................ None
See application file for complete search history.

(56) References Cited

U.S. PATENT DOCUMENTS

| | | | |
|---|---|---|---|
| 2,427,482 | A | 9/1947 | Wiessman |
| 2,986,200 | A | 5/1961 | Nobile |
| 3,104,112 | A | 9/1963 | Crail |
| 3,174,176 | A | 3/1965 | Olson |
| 3,191,990 | A | 6/1965 | Rugg et al. |
| 3,195,670 | A | 7/1965 | Dunn |
| 3,210,092 | A | 10/1965 | Kraus |
| 3,573,877 | A | 4/1971 | Locke |
| 3,580,591 | A | 5/1971 | Coffey et al. |
| 3,589,700 | A | 6/1971 | Ruet et al. |
| 3,592,282 | A | 7/1971 | Zamotin |
| 3,602,522 | A | 8/1971 | Soileau |
| 3,661,228 | A | 5/1972 | Glasser |
| 3,664,450 | A | 5/1972 | Udden et al. |
| 3,682,462 | A | 8/1972 | Papousek |

(Continued)

FOREIGN PATENT DOCUMENTS

| | | |
|---|---|---|
| CA | 2254372 | 5/2000 |
| DE | 10136368 C2 | 2/2003 |
| DE | 10136368 A1 | 2/2003 |
| DE | 10136369 C2 | 2/2003 |
| DE | 10136369 A1 | 2/2003 |

(Continued)

OTHER PUBLICATIONS

Request for Reexamination of U.S. Patent No. 6,196,343, Filed on Apr. 28, 2006 (113 pages).

"Big Boulder Power Wheelchair: Conventional "Tubular" Style Frame"; http://www.wheelchairs.com/bigbounder-page.htm, Accessed on the World Wide Web on Dec. 17, 2003, p. 1–4.

(Continued)

*Primary Examiner*—Peter C. English

(57) ABSTRACT

The invention provides a mid-wheel drive wheelchair assembly (10) which includes a central base frame (11), a seat frame (12) removably attached to the base frame (11), a pair of transversely spaced leading pivot arms (13, 14) pivotally attached to opposite sides of the base frame respectively for pivotal movement about a common transverse pivot axis (17), a pair of ground engaging mid-drive wheels (19, 20) each mounted adjacent the trailing end of a respective side pivot arm (13, 14), a pair of ground engaging front castor wheels (21, 22) rotatably mounted at the leading ends of the pivot arms (13, 14), and a pair of ground engage rear castor wheels (23, 24) rotatably mounted at opposite ends of a rigid transverse port arm (25) which itself is pivotally mounted to the rear of the base frame (11) centrally thereof. Each of the pivot arms (13, 14) is spring mounted with respect to the base frame by means of coil springs (28, 29) arranged so that any pivotal movement of the arms is cushioned by the coil springs.

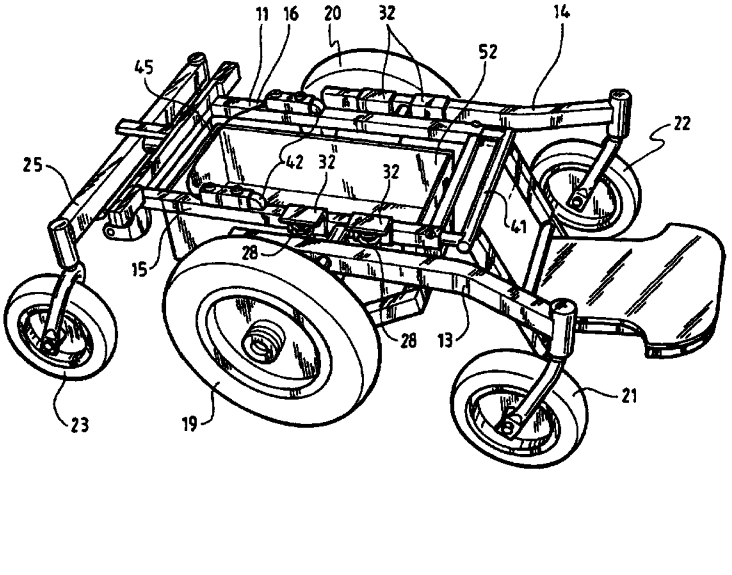

U.S. PATENT DOCUMENTS

| | | | | |
|---|---|---|---|---|
| 3,709,313 | A | 1/1973 | James | |
| 3,848,883 | A | 11/1974 | Breacain | |
| 3,862,751 | A | 1/1975 | Schwaller | |
| 3,876,012 | A | 4/1975 | Regier | |
| 3,883,153 | A | 5/1975 | Singh et al. | |
| 3,901,527 | A | 8/1975 | Danziger et al. | |
| 3,905,437 | A | 9/1975 | Kaiho et al. | |
| 3,917,312 | A * | 11/1975 | Rodaway | 280/250.1 |
| 3,952,822 | A | 4/1976 | Udden et al. | |
| 3,953,054 | A | 4/1976 | Udden et al. | |
| 3,976,152 | A | 8/1976 | Bell | |
| 4,108,449 | A | 8/1978 | Rhodes | |
| 4,118,020 | A | 10/1978 | Myers | |
| 4,119,163 | A | 10/1978 | Ball | |
| 4,128,137 | A | 12/1978 | Booth | |
| 4,222,449 | A | 9/1980 | Feliz | |
| 4,264,085 | A | 4/1981 | Volin | |
| 4,310,167 | A | 1/1982 | McLaurin | |
| 4,333,681 | A | 6/1982 | Nelson | |
| 4,337,958 | A | 7/1982 | Witt et al. | |
| 4,341,278 | A | 7/1982 | Meyer | |
| 4,375,295 | A | 3/1983 | Volin | |
| 4,437,678 | A | 3/1984 | Schultz | |
| 4,455,029 | A | 6/1984 | Taylor | |
| 4,455,031 | A | 6/1984 | Hosaka | |
| 4,483,407 | A | 11/1984 | Iwamoto et al. | |
| 4,500,102 | A | 2/1985 | Haury et al. | |
| 4,513,832 | A | 4/1985 | Engman | |
| 4,545,593 | A | 10/1985 | Farnam | |
| 4,545,616 | A | 10/1985 | Booth | |
| 4,556,229 | A | 12/1985 | Bihler et al. | |
| 4,565,385 | A | 1/1986 | Morford | |
| RE32,242 | E | 9/1986 | Minnebraker | |
| 4,618,155 | A | 10/1986 | Jayne | |
| 4,687,068 | A | 8/1987 | Pagett | |
| 4,720,223 | A | 1/1988 | Neights et al. | |
| 4,721,322 | A | 1/1988 | Hawkins | |
| 4,759,418 | A | 7/1988 | Goldenfeld et al. | |
| 4,805,712 | A | 2/1989 | Singleton | |
| 4,811,966 | A | 3/1989 | Singleton | |
| 4,823,900 | A | 4/1989 | Farnam | |
| 4,826,194 | A | 5/1989 | Sakita | |
| 4,840,394 | A | 6/1989 | Bickler | |
| 4,861,056 | A * | 8/1989 | Duffy et al. | 280/250.1 |
| 4,862,983 | A | 9/1989 | Kreft | |
| 4,886,294 | A | 12/1989 | Nahachewski | |
| 4,905,972 | A | 3/1990 | Scowen | |
| 4,919,441 | A | 4/1990 | Marier et al. | |
| 4,926,952 | A | 5/1990 | Farnam | |
| 4,934,626 | A | 6/1990 | Kimura | |
| 4,962,942 | A | 10/1990 | Barnett et al. | |
| 5,123,495 | A | 6/1992 | Littlejohn et al. | |
| 5,176,393 | A | 1/1993 | Robertson et al. | |
| 5,180,275 | A | 1/1993 | Czech et al. | |
| 5,183,133 | A | 2/1993 | Roy et al. | |
| 5,222,567 | A | 6/1993 | Broadhead et al. | |
| 5,228,709 | A | 7/1993 | Kao | |
| 5,230,522 | A | 7/1993 | Gehlsen et al. | |
| 5,241,876 | A | 9/1993 | Mathis | |
| 5,248,007 | A | 9/1993 | Watkins et al. | |
| 5,290,055 | A | 3/1994 | Treat, Jr. | |
| 5,294,141 | A | 3/1994 | Mentessi et al. | |
| 5,316,328 | A | 5/1994 | Bussinger | |
| 5,341,533 | A | 8/1994 | Seitz | |
| 5,351,744 | A | 10/1994 | Larsson | |
| 5,372,211 | A | 12/1994 | Wilcox et al. | |
| 5,435,404 | A * | 7/1995 | Garin, III | 180/6.5 |
| 5,447,317 | A | 9/1995 | Gehlsen et al. | |
| 5,467,838 | A | 11/1995 | Wu | |
| 5,482,261 | A | 1/1996 | Ortega | |
| 5,513,875 | A | 5/1996 | Tahara et al. | |
| 5,518,081 | A | 5/1996 | Thibodeau | |
| 5,531,284 | A | 7/1996 | Okamoto | |
| 5,540,297 | A * | 7/1996 | Meier | 180/65.5 |
| 5,562,172 | A | 10/1996 | Mick | |
| 5,564,512 | A | 10/1996 | Scheulderman | |
| 5,575,348 | A | 11/1996 | Goertzen et al. | |
| 5,611,555 | A | 3/1997 | Vidal | |
| 5,727,802 | A | 3/1998 | Garven, Jr. et al. | |
| 5,772,237 | A | 6/1998 | Finch et al. | |
| D397,645 | S | 9/1998 | Schaffner | |
| 5,833,248 | A | 11/1998 | Eguchi | |
| 5,848,658 | A * | 12/1998 | Pulver | 180/65.1 |
| 5,851,019 | A | 12/1998 | Gill et al. | |
| 5,853,059 | A | 12/1998 | Goertzen et al. | |
| D404,693 | S | 1/1999 | Schaffner | |
| 5,855,387 | A | 1/1999 | Gill et al. | |
| 5,899,475 | A | 5/1999 | Verhaeg et al. | |
| 5,904,214 | A | 5/1999 | Lin | |
| 5,944,131 | A | 8/1999 | Schaffner et al. | |
| 5,954,351 | A | 9/1999 | Koschinat | |
| 5,964,473 | A | 10/1999 | Degonda et al. | |
| 6,003,624 | A | 12/1999 | Jorgensen et al. | |
| 6,041,876 | A | 3/2000 | Pulver et al. | |
| 6,047,979 | A | 4/2000 | Kraft et al. | |
| 6,062,600 | A | 5/2000 | Kamen et al. | |
| 6,070,898 | A | 6/2000 | Dickie et al. | |
| 6,079,698 | A | 6/2000 | Patterson et al. | |
| 6,079,725 | A | 6/2000 | Lazaros | |
| D429,665 | S | 8/2000 | Dickie | |
| 6,129,165 | A | 10/2000 | Schaffner et al. | |
| 6,131,679 | A | 10/2000 | Pulver et al. | |
| 6,176,335 | B1 | 1/2001 | Schaffner et al. | |
| 6,179,076 | B1 | 1/2001 | Fernie et al. | |
| 6,186,252 | B1 | 2/2001 | Schaffner et al. | |
| 6,196,343 | B1 | 3/2001 | Strautnieks | |
| 6,199,647 | B1 | 3/2001 | Schaffner et al. | |
| 6,206,119 | B1 | 3/2001 | Wu | |
| 6,209,670 | B1 | 4/2001 | Fernie et al. | |
| 6,225,894 | B1 | 5/2001 | Kyrtsos | |
| 6,234,263 | B1 | 5/2001 | Boivin et al. | |
| 6,234,507 | B1 | 5/2001 | Dickie et al. | |
| 6,279,927 | B1 | 8/2001 | Nishihira et al. | |
| 6,312,000 | B1 | 11/2001 | Pauls et al. | |
| 6,322,089 | B1 | 11/2001 | Dantele et al. | |
| 6,341,657 | B1 | 1/2002 | Hopely et al. | |
| 6,341,671 | B1 | 1/2002 | Ebersole | |
| 6,347,688 | B1 | 2/2002 | Hall et al. | |
| 6,357,793 | B1 | 3/2002 | Dickie et al. | |
| 6,405,816 | B1 | 6/2002 | Kamen et al. | |
| 6,428,020 | B1 | 8/2002 | Steadman | |
| 6,454,286 | B1 | 9/2002 | Hosino | |
| 6,460,641 | B1 | 10/2002 | Kral | |
| 6,460,869 | B1 | 10/2002 | Tremouilles | |
| 6,533,305 | B1 | 3/2003 | Falk | |
| 6,533,306 | B2 | 3/2003 | Watkins | |
| 6,543,564 | B1 | 4/2003 | Kamen et al. | |
| 6,543,798 | B2 | 4/2003 | Schaffner et al. | |
| 6,554,086 | B1 | 4/2003 | Goertzen et al. | |
| 6,568,030 | B1 | 5/2003 | Watanabe et al. | |
| 6,581,711 | B1 | 6/2003 | Tuluie | |
| 6,588,799 | B1 | 7/2003 | Sanchez | |
| 6,640,916 | B2 | 11/2003 | Schaffner et al. | |
| 6,688,437 | B2 | 2/2004 | Usherovich | |
| 6,715,845 | B2 | 4/2004 | Kamen et al. | |
| 6,923,280 | B2 | 8/2005 | Goertzen et al. | |
| 6,935,448 | B2 | 8/2005 | Goertzen et al. | |
| 2003/0030243 | A1 | 2/2003 | Engles et al. | |
| 2003/0075365 | A1 | 4/2003 | Fought | |
| 2003/0122332 | A1 | 7/2003 | Engles et al. | |
| 2004/0032119 | A1 | 2/2004 | Tran et al. | |

FOREIGN PATENT DOCUMENTS

| | | |
|---|---|---|
| EP | 127929 | 12/1984 |
| EP | 677285 | 10/1995 |
| EP | 908165 | 4/1999 |
| EP | 908166 | 4/1999 |
| EP | 988848 | 3/2000 |
| EP | 1279391 | 1/2003 |
| EP | 1279392 | 1/2003 |
| FR | 2399822 | 3/1979 |
| FR | 2498925 | 8/1982 |
| JP | 58-48304 | 3/1983 |
| JP | 04-158864 | 6/1992 |
| JP | 07-328073 | 12/1995 |
| JP | 08-038552 | 2/1996 |
| JP | 410248877 | 9/1998 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| WO | WO 82/00445 | 2/1982 |
| WO | WO 84/04451 | 11/1984 |
| WO | WO 90/06097 | 6/1990 |
| WO | WO 92/09463 | 6/1992 |
| WO | WO 93/24342 | 12/1993 |
| WO | WO 96/15752 | 5/1996 |
| WO | WO 98/46184 | 10/1998 |
| WO | WO 00/08910 | 2/2000 |
| WO | WO 00/09356 | 2/2000 |
| WO | WO 00/12040 | 3/2000 |
| WO | WO 00/66060 | 11/2000 |
| WO | WO 02/34190 | 5/2002 |
| WO | WO 2003/030800 | 4/2003 |

OTHER PUBLICATIONS

"Bounder Plus Power Wheelchair: Conventional "Tubular" Style Frame"; http://www.wheelchairs.com/plus.htm, Accessed on the World Wide Web on Dec. 17, 2003, p. 1–4.

"Frog Legs: Smooth Ride Ahead"; http://www.froglegsinc.com/index.php, accessed on the World Wide Web on Dec. 17, 2003, p. 105.

"Frog Legs Tires", http://mdtap.org/tt/1999.09/prod.html, Accessed on the World Wide Web on Dec. 17, 2003, p. 1–3.

"Invacare Pronto M71 Jr. Power Wheelchair Manual"; Accessed on the World Wide Web on Dec. 17, 2003.

"Invacare Storm Series TDX Power Wheelchairs Manual"; Accessed on the World Wide Web on Dec. 17, 2003, p. 1–24.

"Invacare Xterra Series GT Power Wheelchair Manual", Accesse on the World Wide Web on Dec. 17, 2003, p. 1–4.

"Jazzy 1122", Pride Mobile Products Corp., Accessed on the World Wide Web on Dec. 17, 2003, p. 1–2.

"Jazzy 1133", Pride Mobile Products Corp., Accessed on the World Wide Web on Dec. 17, 2003. p. 1–2.

"Jazzy 1170XL", Pride Mobile Products Corp., Accessed on the World Wide Web on Dec. 17, 2003, p. 1–2.

"Bruno Independent Living Aids ISP 9001 Certified"; http://www.bruno.com/power__chairs.htm, Accessed on the World Wide Web on Dec. 17, 2003, p. 1–5.

"Top End Terminator SS Sports Wheelchair", http://phc–online.com/terminator__ss.htm, Accessed on the World Wide Web on Dec. 17, 2003, p. 1–5.

"Transactions of the Institute of Measurement and Control", The British Library of Science Technology and Business, vol. 24, Nov. 5, 2002, p. 1–15.

MJ Lawn et al. "Modeling of a Stair–Climbing Wheelchair Mechanism with High Single–Step Capability" IEEE Transactions on Neutral Systems and Rehabilitation Engineering, Sep. 2003.

Quickie G–424 User Instruction Manual & Warranty, 930484 Rev. A (27 sheets).

10 Photographs (8.5×11) of Quickie G–424 Wheelchair obtained Nov. 24, 2004.

Sunrise Medical, Inc., Power Products Parts Manual, 930307 Rev. K (531 sheets), Jul. 2004. (Note: various dates are listed therein.).

"All–Terrain Wheelchair, Designer's Corner", Design News, Feb. 24, 1992, cover page and p. 54.

International Search Report from PCT/US98/07543 which cited FR 2399822.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3 and 7 is confirmed.

Claims 1, 2, 4–6 and 8 are cancelled.

* * * * *